United States Patent [19]

Gellert

[11] Patent Number: 5,299,928
[45] Date of Patent: Apr. 5, 1994

[54] TWO-PIECE INJECTION MOLDING NOZZLE SEAL

[76] Inventor: Jobst U. Gellert, 7A Prince Street, Georgetown, Ontario, Canada, L7G 2X1

[21] Appl. No.: 95,538

[22] Filed: Jul. 26, 1993

[51] Int. Cl.[5] .............................................. B29C 45/20
[52] U.S. Cl. ............................... 425/190; 264/328.15; 425/549
[58] Field of Search .................... 425/190, 549, 568; 264/328.15

[56] References Cited

U.S. PATENT DOCUMENTS 4,043,740  8/1977  Gellert ................................. 425/567
4,875,848  10/1989  Gellert ................................. 425/549
4,981,431  1/1991  Schmidt .............................. 425/549
5,028,227  7/1991  Gellert et al. ........................ 425/190

*Primary Examiner*—Tim Heitbrink
*Attorney, Agent, or Firm*—Dalesman & Company

[57] ABSTRACT

A two-piece injection molding nozzle seal. The inner piece through which the melt duct extends is formed of a highly thermally conductive material to enhance heat transfer during the thermodynamic cycle. The surrounding outer retaining piece which extends from the heated nozzle into contact with the cooled mold to provide the necessary seal is formed of a substantially less conductive material to avoid undue heat loss.

6 Claims, 3 Drawing Sheets

TWO-PIECE INJECTION MOLDING NOZZLE SEAL

BACKGROUND OF THE INVENTION

This invention relates generally to injection molding and more particularly to a two-piece nozzle seal which is seated in the front end of a nozzle to bridge the insulative air space between the heated nozzle and the cooled mold.

One piece nozzle seals and gate inserts having various configurations to be seated in the front end of a heated nozzle are well known. The applicants' U.S. Pat. No. 4,043,740 which issued Aug. 23, 1977 shows a nozzle seal which fits into a matching seat in the front end of the nozzle and has a portion which tapers inwardly around the gate. U.S. Pat. No. 4,981,431 to Schmidt which issued Jan. 1, 1991 discloses a nozzle seal having an outer sealing flange which is screwed into place in a seat in the front end of the heated nozzle. The applicants' U.S. Pat. No. 4,875,848 which issued Oct. 24, 1989 describes a gate insert which is also screwed into place, but has an integral electrical heating element U.S. Pat. No. 5,028,227 to Gellert et al. which issued Jul. 2, 1991 relates to a gate insert having a circumferential removal flange to allow it to be pried out of place in the seat in the front end of the nozzle. While these previous nozzle seals are satisfactory for many applications, when molding materials having a narrow temperature window such as Polyethylene Terephthalate (PET) it is very desirable to provide faster heat transfer along the nozzle seal without excessive heat loss to the surrounding cooled mold.

SUMMARY OF THE INVENTION

Accordingly, it is an object of the present invention to at least partially overcome the disadvantages of the prior art by providing an injection molding nozzle seal with a highly conductive inner piece mounted in a lesser conductive outer piece to improve heat transfer without undue heat loss.

To this end, in one of its aspects, the invention provides injection molding apparatus having at least one heated nozzle and at least one nozzle seal, the at least one heated nozzle having a rear end, a front end, and a central melt bore extending therethrough from the rear end to the front end, the at least one heated nozzle being seated in a cooled mold with an insulative air space extending between the at least one heated nozzle and the surrounding cooled mold and the central melt bore of the nozzle extending in alignment with a gate to a cavity, the at least one nozzle seal having a rear end, a front end and a central melt duct extending therethrough from the rear end to the front end, the at least one nozzle seal being mounted with the rear end of the at least one nozzle seal received in a threaded seat in the front end of the at least one nozzle and the front end of the at least one nozzle seal in sealing contact in an opening in the mold around the gate to bridge the insulative air space with the melt duct through the at least one nozzle seal extending in alignment with the melt bore through the at least one nozzle, having the improvement wherein the at least one nozzle seal comprises a hollow inner piece formed of a highly thermally conductive material extending coaxially in a hollow outer retaining piece formed of a material which is substantially less conductive than the material forming the inner piece, the inner piece having an outer surface, a rear end, and a front end, with the central melt duct extending therethrough from the rear end to the front end, the outer retaining piece bridging the insulative air space and having a rear end, a front end, an outer surface, and an inner surface to fit around at least a first portion of the outer surface of the inner piece, the outer surface of the outer retaining piece having a front portion to be in sealing contact in the opening in the mold around the gate and a threaded rear portion to be received in the threaded seat in the front end of the at least one nozzle to securely retain the inner piece in place with the rear end of the inner piece received in the seat in the front end of the at least one nozzle and the central melt duct extending in alignment with the melt bore through the at least one nozzle.

Further objects and advantages of the invention will appear from the following description taken together with the accompanying drawings.

DETAILED DESCRIPTION OF THE INVENTION

Figure 1:
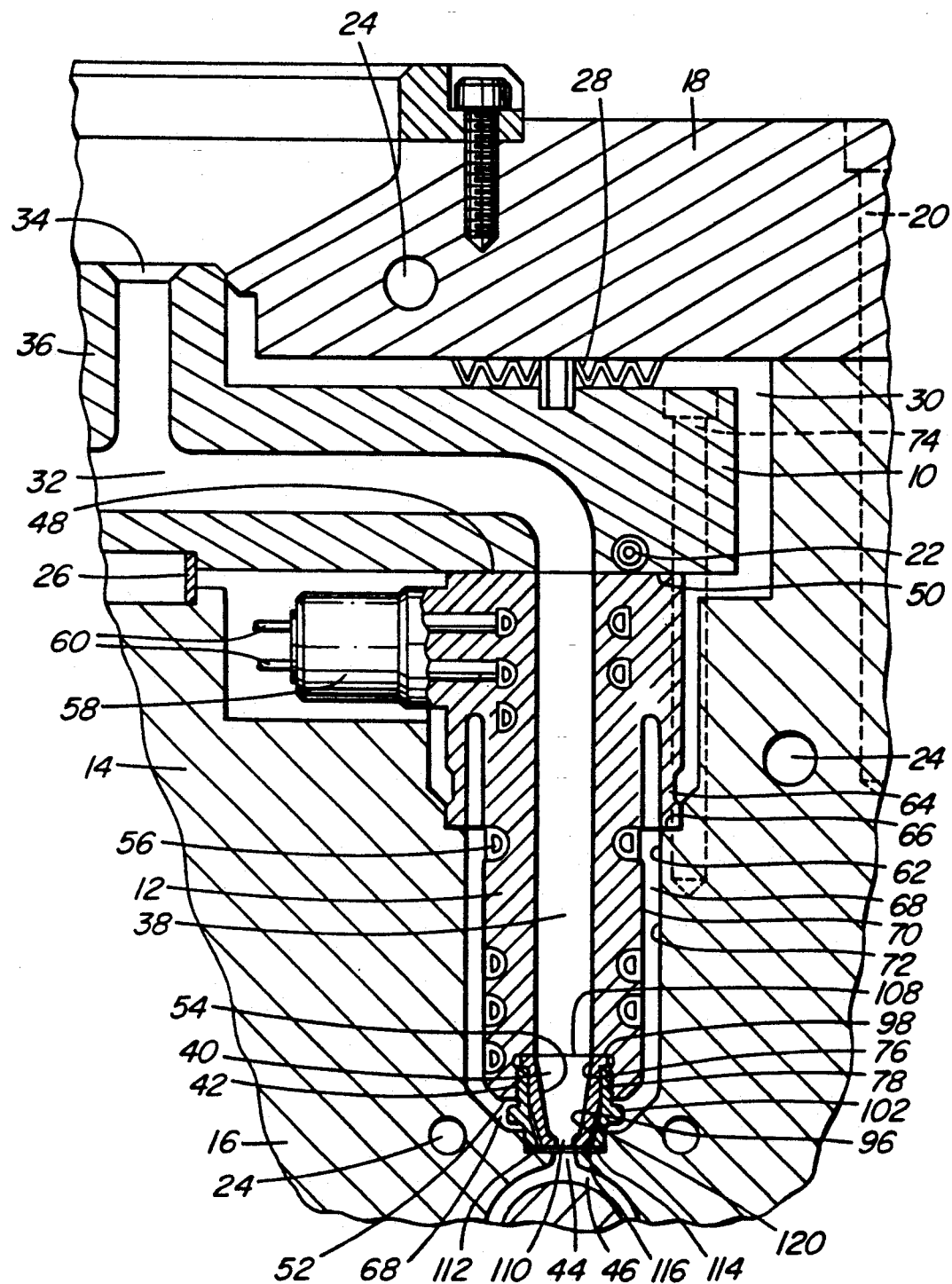
FIG. 1 is a sectional view of a portion of a multi-cavity injection molding system showing a two-piece nozzle seal according to a first embodiment of the invention.

Reference is first made to FIG. 1 which shows a portion of a multi-cavity injection molding system or apparatus having a melt distribution manifold 10 interconnecting several heated nozzles 12 in a mold 14. While the mold 14 usually has a greater number of plates depending upon the application, in this case only a cavity plate 16 and back plate 18 which are secured together by bolts 20 are shown for ease of illustration. The melt distribution manifold 10 is heated by an integral electrical heating element 22 and the mold 14 is cooled by pumping cooling water through cooling conduits 24. The melt distribution manifold 10 is mounted between the cavity plate 16 and the back plate 18 by a central locating ring 26 and insulative and resilient spacer members 28 which provide an insulative air space 30 between the heated manifold 10 and the surrounding mold 14.

A melt passage 32 extends from a central inlet 34 in a cylindrical inlet portion 36 of the manifold 10 and branches outward in the manifold 10 to convey melt through a central bore 38 in each of the heated nozzles 12. The melt then flows through a melt duct 40 in a two-piece nozzle seal 42 according to a first embodiment of the invention to a gate 44 extending through the cavity plate 16 leading to a cavity 46. Each nozzle 12 has a rear end 48 which abuts against the front face 50 of the melt distribution manifold 10 and a front end 52 with a threaded seat 54 extending around the central melt bore 38. An electrical heating element 56 extends in the nozzle 12 integrally around the central melt bore 38 to an external terminal 58 to receive power through leads 60. The nozzle 12 is seated in a well 62 in the cavity plate 16 with an insulating and locating flange 64 sitting on a circular shoulder 66 in the well 62 to provide an insulative air space 68 between the outer surface 70 of the heated nozzle 12 and the inner surface 72 of the cooled mold 14. The nozzles 12 are securely retained in the wells 62 by bolts 74 which extend from the manifold 10 into the cavity plate 16.

Figure 2:
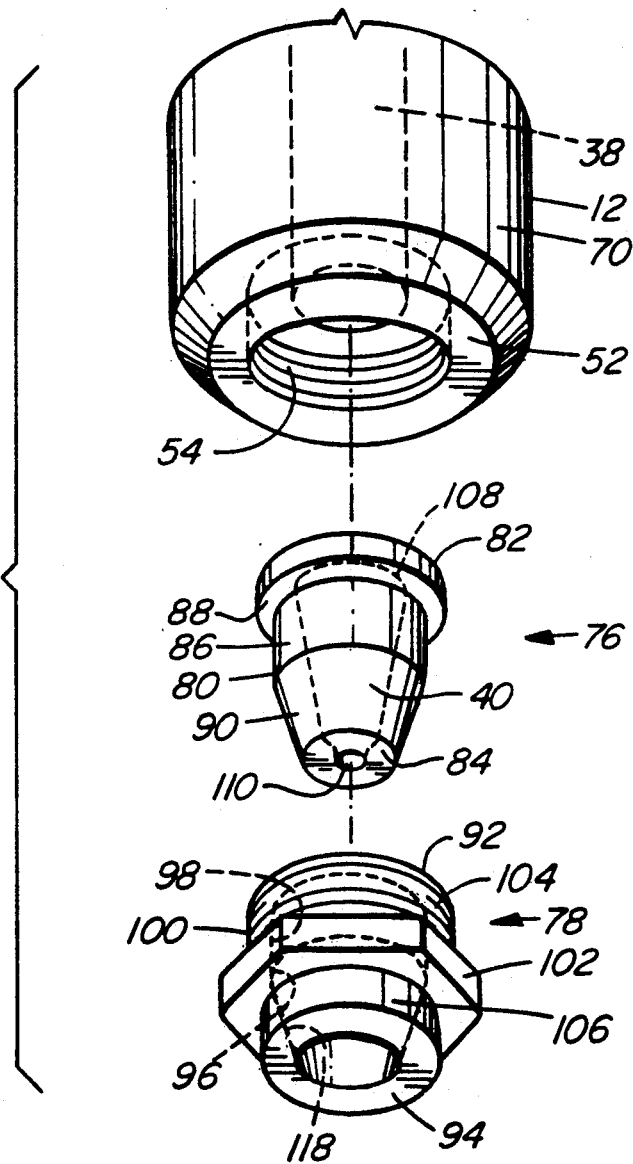
FIG. 2 is an exploded isometric view showing the inner and outer pieces of the nozzle seal seen in FIG. 1 in position for mounting in the seat in the front end of the heated nozzle.

Also referring to FIG. 2, the two-piece nozzle seal 42 according to this embodiment of the invention has the melt duct 40 extending through a hollow inner piece 76 which is retained in place in the seat 54 in the front end 52 of the nozzle 12 by a coaxial outer retaining piece 78. The inner piece 76 of the nozzle seal 42 is formed of a highly thermally conductive material such as a beryllium copper alloy and has an outer surface 80, a rear end 82, and a front end 84. In this embodiment, the outer surface 80 has a cylindrical portion 86 extending between a shoulder 88 which extends outwardly near the rear end 82 and a portion 90 which tapers inwardly to the front end 84. The hollow outer retaining piece 78 of the nozzle seal 42 has a rear end 92, a front end 94, and an inner surface 96 with a cylindrical portion 98 which fits around the cylindrical portion 86 of the outer surface 80 of the inner piece 76. The outer surface 100 of the outer piece 78 has a hexagonal nut-shaped intermediate portion 102 extending between a threaded rear portion 104 and a cylindrical front portion 106. The threaded rear portion 104 is screwed into the threaded seat 54 in the front end 52 of the nozzle 12 with the rear end 92 of the outer piece 78 bearing against the shoulder 88 to securely retain the inner piece 76 in place. As can be seen, in this configuration, the gate 44 extends through the cavity plate 16 to the cavity 46. The melt duct 40 extending through the inner piece 76 of the nozzle seal 42 tapers inwardly from an inlet 108 at the rear end 82 which matches and is aligned with the central melt bore 38 through the nozzle 12 to an outlet 110 at the front end 84 aligned with the gate 44. The nut-shaped intermediate portion 102 extends outwardly into the insulative air space 68 between the front end 52 of the heated nozzle and the cooled mold 14 and is engageable by a suitable tool to tighten the nozzle seal 42 in place or remove it for cleaning or replacement if necessary.

The outer piece 78 of the nozzle seal 42 extends forwardly into a circular opening or seat 112 extending in the mold 14 around the gate 44. The cylindrical front portion 106 of the outer surface 100 of the outer piece is in sealing contact with the cylindrical surface 114 of the opening 112 to prevent pressurized melt escaping into the insulative air space 68. The outer piece 78 of the nozzle seal 42 which is in contact with both the heated nozzle 12 and the cooled mold 14 is formed of a material such as a titanium alloy which is much less thermally conductive than the beryllium copper inner piece 76. The highly conductive inner piece 76 being retained in a lesser conductive outer piece 78 provides the combination of sufficient conductivity along the inner piece 76 to maintain a rapid thermodynamic cycle and sufficient thermal separation through the outer piece 78 to avoid undue heat loss to the cooled mold 14. In the configuration shown, the front end 84 of the inner piece 76 is aligned with the front end 94 of the outer piece 78 with a small gap 116 between them and the mold 14. This gap 116 provides for thermal expansion of the nozzle 12 and also fills with melt which solidifies and provides insulation between the nozzle seal 42 and the cooled mold 14. In this embodiment, additional insulation is provided by a circumferential insulation space 120 which is provided between the tapered portion 90 of the outer surface 80 of the inner piece 76 and a surrounding inwardly tapered portion 118 of the inner surface 96 of the outer piece 78. This space 120 also fills with melt which solidifies to provide additional insulation between the highly conductive inner piece 76 and the lesser conductive outer piece 78.

In use, the injection molding system is assembled as shown in FIG. 1. After assembly, electrical power is applied to the heating element 22 in the manifold 10 and to the heating elements 56 in the nozzles 12 to heat them to a predetermined operating temperature. Pressurized melt is applied from a molding machine (not shown) to the central inlet 34 of the melt passage 32 according to a predetermined cycle. The melt flows through the melt distribution manifold 10, nozzles 12, nozzle seals 42 and gates 44 into the cavities 46. After the cavities 46 are filled and a suitable packing and cooling period has expired, the injection pressure is released and the melt conveying system is decompressed to avoid stringing through the open gates 44. The mold 14 is then opened to eject the molded products. After ejection, the mold 14 is closed and the cycle is repeated continuously with a cycle time dependent upon the size of the cavities 46 and the type of material being molded.

During this repetitious injection cycle, heat is continuously transferred by the nozzle seal 42 according to a predetermined thermodynamic cycle. The proximity of the cooled metal around the cavity 46 and the uniform thin insulation provided between it and the nozzle seal 42 allows for controlled solidification of the sprue. During injection, the highly conductive inner piece 76 of the nozzle seal 42 helps to conduct excess heat which is generated by the friction of the melt flowing through the constricted area of the gate 44 rearwardly to avoid stringing and drooling of the melt when the mold opens for ejection. After the melt has stopped flowing, solidification of melt in the gate 44 is enhanced by the removal of excess friction heat through the inner piece 76 of the nozzle seal 42. The transfer of heat to and removal of heat from the melt in the gate 44 during the operating cycle is enhanced by the inner piece 76 of the nozzle seal 42 being formed of a highly conductive material, while the surrounding outer piece 78 being formed of a lesser conductive material avoids undue heat loss to the surrounding cooled mold 14. The improved heat transfer back and forth provides faster cooling and solidification of the melt at low temperatures in the gate area. When molding highly crystalline material such as PET preforms, this has the advantage that the melt solidifies fast enough to remain in an amorphous condition. Thus, cycle time is reduced and cosmetically cleaner gates are provided.

Figure 3:
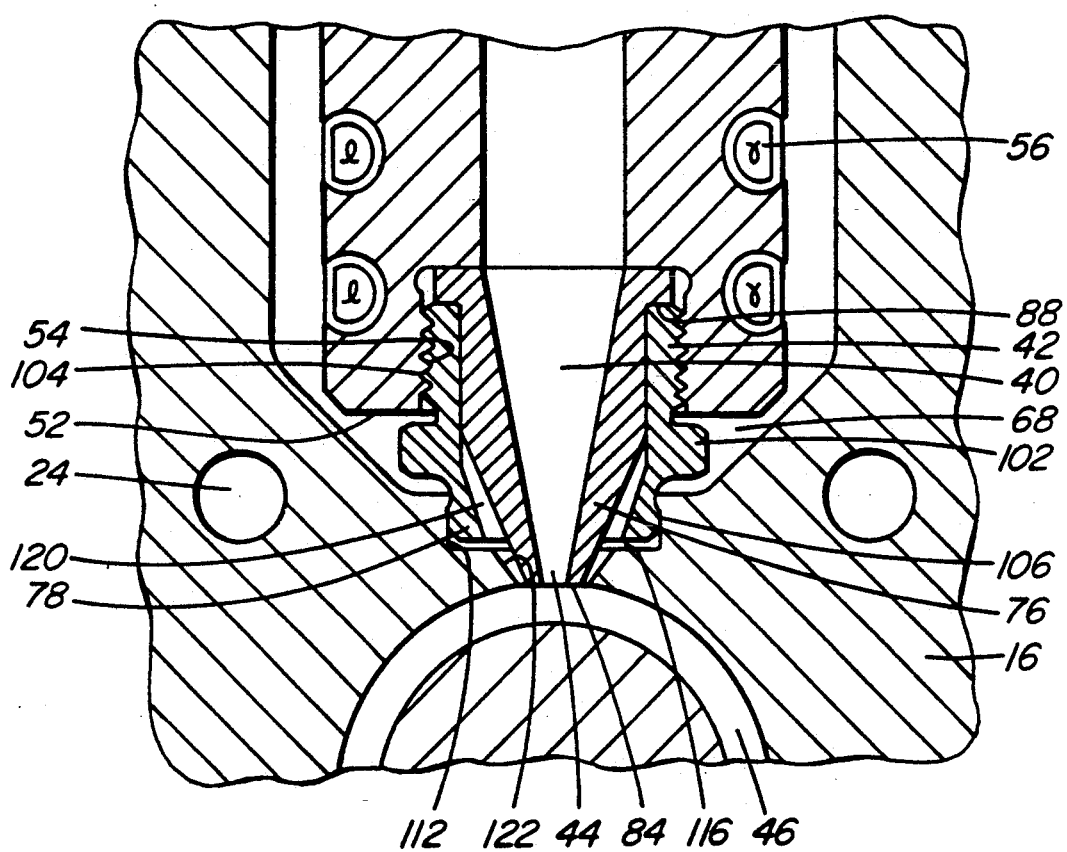
FIG. 3 is a sectional view showing a two-piece nozzle seal according to a second embodiment of the invention seated in the front end of a heated nozzle.

Reference is now made to FIG. 3 to describe a second embodiment of the invention. As most of the elements are the same as those described above, common elements are described and illustrated using the same reference numerals. In this embodiment, the cavity plate 16 has a tapered hole 122 extending from the opening 112 through to the cavity 46. The front end 84 of the inner piece 76 of the nozzle seal 42 extends through the tapered hole 122 to the cavity 46 and the gate 44 is formed by a front portion of the tapered melt duct 40 extending centrally through the inner piece. The outer retaining piece 78 is seated as described above with its rear end 92 screwed into the threaded seat 54 in the front end 52 of the nozzle 12 and its front end 84 in the opening 112 in the mold 14. The inner piece 76 is formed of a highly conductive material such as beryllium copper to promote heat transfer along the nozzle seal 42, while the outer retaining piece 78 is formed of a lesser conductive material such as a titanium alloy to reduce heat loss to the cooled mold 14.

While the description of the two-piece nozzle seal according to the invention has been given with respect to preferred embodiments, it will be evident that various other modifications are possible without departing from the scope of the invention as understood by those skilled in the art and as defined in the following claims.

The embodiments of the invention in which an exclusive property or privilege is claimed are defined as follows:

1. In an injection molding apparatus having at least one heated nozzle and at least one nozzle seal, the at least one heated nozzle having a rear end, a front end, and a central melt bore extending therethrough from the rear end to the front end, the at least one heated nozzle being seated in a surrounding cooled mold with an insulative air space extending between the at least one heated nozzle and the surrounding cooled mold and the central melt bore of the nozzle extending in alignment with a gate to a cavity, the at least one nozzle seal having a rear end, a front end, and a central melt duct extending therethrough from the rear end to the front end, the rear end of the at least one nozzle seal being mounted in a threaded seat in the front end of the at least one nozzle and the front end of the at least one nozzle seal in sealing contact in an opening in the mold around the gate to bridge the insulative air space with the melt duct through the at least one nozzle seal extending in alignment with the melt bore through the at least one nozzle, the improvement wherein:

the at least one nozzle seal comprises a hollow inner piece formed of a highly thermally conductive material extending coaxially in a hollow outer retaining piece, said hollow outer retaining piece being formed of a material which is substantially less conductive than the material forming the inner piece, the inner piece having an outer surface, a rear end, and a front end, with the central melt duct extending therethrough from the rear end to the front end, the outer retaining piece bridging the insulative air space and having a rear end, a front end, an outer surface, and an inner surface to fit around at least a first portion of the outer surface of the inner piece, the outer surface of the outer retaining piece having a front portion to be in sealing contact in the opening in the mold around the gate and a threaded rear portion to be received in the threaded seat in the front end of the at least one nozzle to securely retain the inner piece in place with the rear end of the inner piece received in the seat in the front end of the at least one nozzle and the central melt duct extending in alignment with the melt bore through the at least one nozzle.

2. Injection molding apparatus as claimed in claim 1 wherein the outer surface of the inner piece has an outwardly extending shoulder against which the rear end of the outer piece is in bearing contact to securely retain the inner piece in place.

3. Injection molding apparatus as claimed in claim 2 wherein a circumferential insulative space extends rearwardly from the front end of the at least one nozzle seal between the inner surface of the outer piece and a second portion of the outer surface of the inner piece.

4. Injection molding apparatus as claimed in claim 3 wherein the outer surface of the outer piece has a nut-shaped intermediate portion to extend outwardly into the insulative air space between the front end of the at least one nozzle and the mold, the nut-shaped intermediate portion being engageable by a suitable tool during installation and removal of the at least one nozzle seal.

5. Injection molding apparatus as claimed in claim 1 wherein the gate to the cavity extends through the mold, and the melt duct extending through the inner piece of the at least one nozzle seal extends in alignment with the gate.

6. Injection molding apparatus as claimed in claim 1 wherein the front end of the inner piece of the at least one nozzle seal extends forwardly through a hole in the mold to the cavity, and the gate to the cavity is formed by the melt duct extending through the inner piece.

* * * * *